United States Patent
Boys et al.

[11] Patent Number: 5,898,579
[45] Date of Patent: *Apr. 27, 1999

[54] NON-CONTACT POWER DISTRIBUTION SYSTEM

[75] Inventors: John Talbot Boys, Auckland, New Zealand; Shuzo Nishino, Osaka, Japan

[73] Assignees: Auckland UniServices Limited, Auckland, New Zealand; Daifuku Co, Limited, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/976,582

[22] Filed: Nov. 24, 1997

Related U.S. Application Data

[63] Continuation of application No. 08/335,709, filed as application No. PCT/NZ93/00031, May 5, 1993, abandoned.

[30] Foreign Application Priority Data

| May 10, 1992 | [NZ] | New Zealand | 241380 |
| Jun. 10, 1992 | [NZ] | New Zealand | 243102 |
| Feb. 22, 1993 | [NZ] | New Zealand | 245956 |
| Mar. 26, 1993 | [NZ] | New Zealand | 247268 |

[51] Int. Cl.⁶ ........................................... H02J 3/06
[52] U.S. Cl. ........................ 363/23; 363/165; 307/104; 191/10
[58] Field of Search ............... 363/22, 23, 39, 363/40, 160, 161, 163, 165; 323/209, 210, 211, 370; 307/104; 191/10

[56] References Cited

U.S. PATENT DOCUMENTS

| 4,114,010 | 9/1978 | Lewis | 219/10.41 |
| 4,331,225 | 5/1982 | Bolger | 191/10 |
| 4,928,087 | 5/1990 | Kreft et al. | 340/825.71 |
| 5,095,224 | 3/1992 | Renger | 327/110 |
| 5,207,304 | 5/1993 | Lechner et al. | 191/10 |
| 5,225,972 | 7/1993 | Sakamoto | 363/22 |
| 5,293,308 | 3/1994 | Boys et al. | 363/37 |
| 5,365,173 | 11/1994 | Zou et al. | 324/318 |
| 5,450,305 | 9/1995 | Boys et al. | 363/24 |
| 5,528,113 | 6/1996 | Boys et al. | 318/16 |
| 5,573,090 | 11/1996 | Ross | 191/10 |
| 5,619,078 | 4/1997 | Boys et al. | 307/85 |
| 5,669,470 | 9/1997 | Ross | 191/10 |
| 5,710,502 | 1/1998 | Poumey | 320/2 |
| 5,821,638 | 10/1998 | Boys et al. | 307/104 |

*Primary Examiner*—Edward H. Tso
*Assistant Examiner*—Derek J. Jardieu
*Attorney, Agent, or Firm*—Young & Thompson

[57] ABSTRACT

An inductively coupled power distribution system for moving vehicles, in which resonating primary circuits to distribute power for resonating secondary circuits to collect and use in an optimized manner. In order to have all circuits resonating at substantially the same frequency, devices which detect and adjust resonating components are used, such as a frequency drift compensator in which the present frequency is compared to a reference voltage and causes a driver to be ON or OFF accordingly. Switches are driven CLOSED or OPEN respectively and when CLOSED, supplementary capacitors are included with a main capacitor in a primary resonant circuit. Dithering or pulsed control provides a continuous control of resonance, as the system takes some milliseconds to respond.

15 Claims, 6 Drawing Sheets

9.7  9.8  9.9       10.1
         10 KHz

NON-CONTACT POWER DISTRIBUTION SYSTEM

This application is a continuation of application Ser. No. 08/335,709, filed Nov. 10, 1994, now abandoned, which was the 35 USC 371 national phase of International application PCT/N293/00021 filed on May 5, 1993, which designated the United States.

BACKGROUND OF THE INVENTION

1. Technical Filed of the Invention

This invention relates to the provision of inductively coupled electric power across a gap to mobile or portable power consuming devices such as vehicles. It more particularly relates to those inductively coupled systems that employ resonant circuits, and most particularly to ways to maintain mutually consistent resonant frequencies in both primary and secondary circuits.

2. Description of the Related Art

Modern semiconductor developments have made feasible the provision of inductively coupled power to moving vehicles, and have permitted the use of resonant LC circuits in either or both the primary and the secondary circuits. Resonance provides—among other advantages—(a) large circulating currents despite relatively small power supplies, (b) relatively low emission of electromagnetic fields at harmonics of the operating frequency, (c) small ferromagnetic cores, if any, and (d) novel means for control of the electromagnetic coupling across spaces.

Clearly the system will be most efficient when all resonant circuits resonate naturally at substantially the same frequency, and substantially in phase. Despite careful tuning at the time of installation, effects on inductance and also on the operating parameters of switches caused by varying loads can cause operating frequencies to change. This variability owes its origin in part to combined use in preferred embodiments of the invention of the trackway conductor as both the resonating inductor and as the emitter of changing magnetic fields. The resonant inductor is actually the distributed inductance of the trackway and is inherently vulnerable to induced currents in adjacent secondary coils, which vary according to consumption. The preferred prior-art switching power supply simply detects each zero crossing within the current in the resonant circuit and causes immediate switching transitions. It has no means to determine the actual operating frequency—apart from a momentarily applied start-up oscillator.

The tightness of primary-secondary coupling may give rise to more than one condition for which the entire system appears to be in resonance but generally only one of these conditions correlates to a frequency at which optimal power transfer can take place.

Because the efficiency of power transfer will fall if the resonant frequencies are not well matched, it is hence desirable to maintain a relatively constant operating frequency during all reasonable conditions of use.

SUMMARY OF THE INVENTION

It is an object of the present invention to provide an improved system for the maintenance of consistent resonating frequencies within an inductively coupled power transfer system, or one which will at least provide the public with a useful choice.

In one aspect the invention provides a non-contact power distribution system for causing electric power to be transferred from a primary resonant circuit capable of generating an alternating magnetic field to at least one movable body provided with at least one secondary resonant circuit incorporating an inductive coil for intercepting said magnetic field and thereby generating an electromotive force, characterised in that said power distribution system includes means to maintain the resonant frequency of the primary resonant circuit and the secondary resonant circuits at or close to a consistent frequency.

In another aspect the invention provides a non-contact power supply for causing electric power to be transferred from a primary resonant circuit to at least one movable body provided with at least one secondary resonant circuit incorporating an inductive coil for intercepting a magnetic field and thereby generating an electromotive force, said power supply comprising a switching power supply which generates a high-frequency resonant current, characterised in that there is means to maintain the frequency of the resonant current at or close to a predetermined frequency.

BRIEF DESCRIPTION OF THE DRAWINGS

The following is a description of several preferred forms of the invention, given by way of example only, with reference to the accompanying diagrams. These examples relate in particular to a system for distributing power to moving trolleys running on rails adjacent to primary conductors, though it is of course applicable to other power consumers such as lamps or battery chargers.

DESCRIPTION OF THE PREFERRED EMBODIMENTS

Figure 9A:
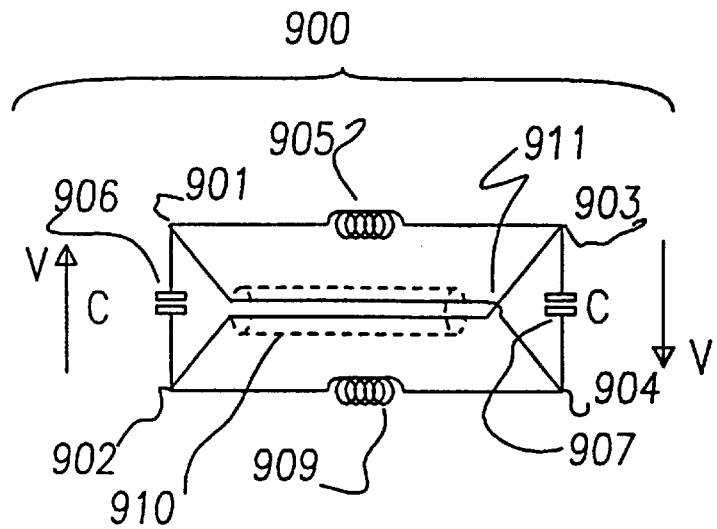
FIG. 9a–c: shows the use of zero-inductance cables in principle (9a), and in practice (9b and 9c) to link spaced-apart nodes of a circuit having multiple resonant elements, and thereby restrict oscillation modes.
Figure 9B:
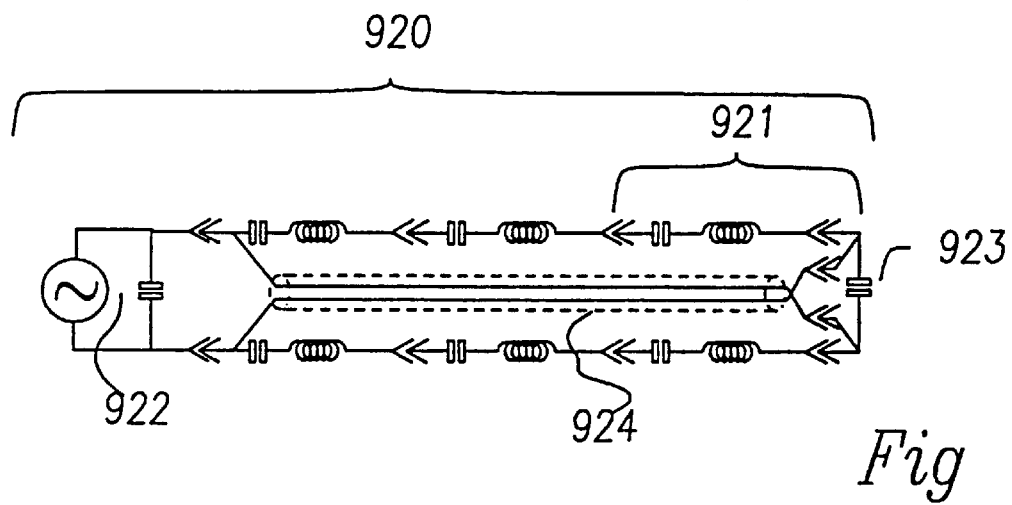
Figure 9C:
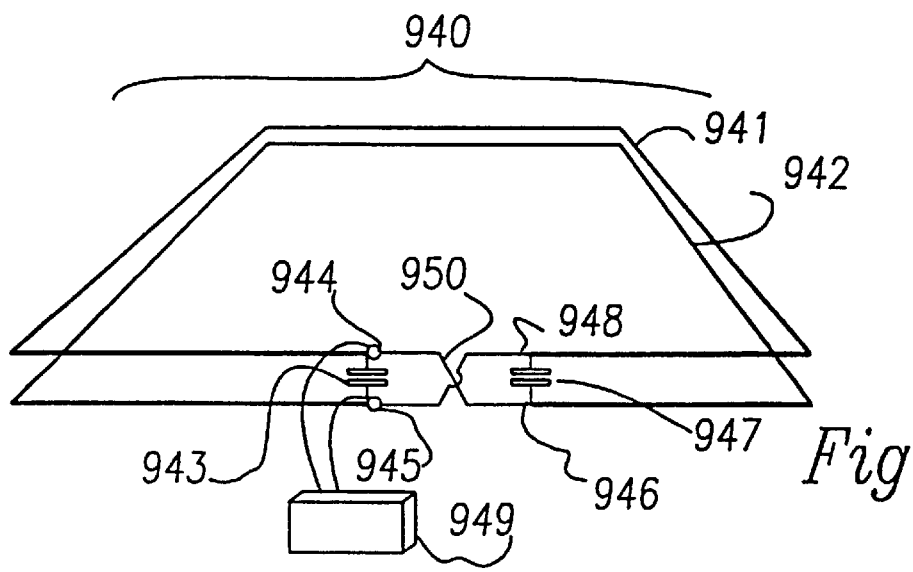

All embodiments have the common objective of providing a consistent resonant frequency across the power distribution system. Advantages of providing a system-wide resonant frequency include:

1. all resonant circuits have substantially one point zero (ID) power factor—they act like pure resistances.
2. The Q of the system is raised.
3. Aberrant modes of oscillation are inhibited.
4. Coupling is enhanced.
5. Power transfer is enhanced Some of a number of possible solutions to the problem of ensuring a consistent resonant frequency across an entire system are illustrated by the preferred embodiments described herein. In summary the embodiments to be described are:

1. Tune the primary loop with a small switched capacitor across the main resonant capacitor. This method endeavours to keep the system resonant frequency constant. (FIG. 1, FIG. 7)
2. Tune the primary loop using a pair of variable inductances; one in series with each side of the primary loop. This method also endeavours to keep the system resonant frequency constant. (FIG. 2)
3. Using switched inductors, (eg switched by SCR devices) to vary the resonant inductance by small increments. This solution endeavours to keep the system resonant frequency constant. (FIG. 3)
4. Render the primary power supply a frequency-stable source rather than drift in frequency as set by track inductance parameters. This approach will keep the system resonant frequency constant. (FIG. 4)
5. Add tuning (or frequency-tracking) means on the secondary circuits—the trolleys themselves. This system has a variable overall frequency. (FIG. 5)
6. Use a "dummy trolley" or artificial secondary resonant circuit at or near the power supply to effect control. This system also has a variable overall frequency. (FIG. 6)
7. Use switched capacitances within the power supply to vary the resonant capacitance by small increments. (Dithering or pulsed control provides finer control). (FIG. 7)
8. Use zero-inductance cables to link spaced-apart nodes having similar amplitude and phase of a circuit, usually at capacitors, and thereby restrict oscillation modes. (FIG. 9a–c)

Embodiments shown in FIGS. 1, 2, 3 and 6 assume the presence of a master controller, not illustrated therein, to monitor the frequency of the resonant current in the primary circuit and take suitable steps to alter specific lumped circuit parameters (one or both of L and C) should the frequency drift away from a target range. This controller may be a type of phase-locked loop, although a preferable form is a proportional controller of the type shown in FIG. 7.

Figure 1:
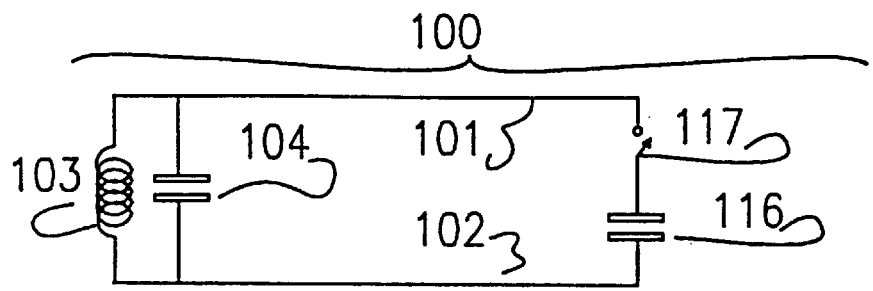
FIG. 1: is a circuit diagram illustrating an induction line which can be tuned by a tuning capacitor.

Embodiment 1—see FIG. 1

An induction line 100 is provided by a pair of litz wire cables 101 and 102, together with a coil 103 and a main capacitor 104. (The power source is not shown but would be connected across inductor 103). In this example an auxiliary capacitor 116 is provided in parallel with the main capacitor, and can be switched in or out of the circuit by an appropriate switch 117, in order to vary the resonant frequency of the induction line. By providing an auxiliary capacitor 116, it is possible to tune the resonant frequency of the induction line in order to accommodate changes to the frequency resulting from the number of movement of movable bodies, (typically electrically powered trolleys) on the induction line. The frequency change is a result of changing inductance, hence a shift in the frequency of resonance. If a substantially constant primary frequency is maintained, secondary circuits should not require re-tuning.

It will be appreciated that the capacitor 116 can be in series, instead of in parallel with the main capacitor (where a switch would instead bypass it), and it could comprise one or more variable capacitors, so that the resonant frequency of the line can be tuned by varying the capacitance of the auxiliary capacitor 116. In another version the two capacitors may be replaced by one variable capacitor.

Embodiment 2

Figure 2:
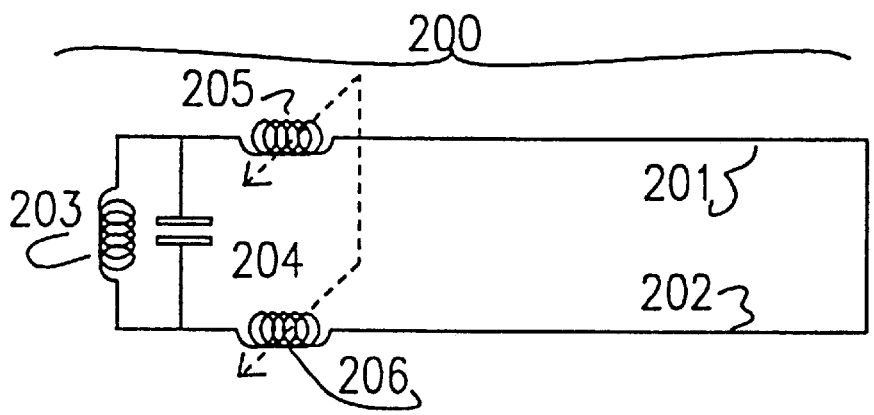
FIG. 2: is a circuit diagram of an induction line which can be tuned by means of adjustable coils.

FIG. 2 shows a similar induction line 200, having a pair of litz wire cables 201 and 202 forming a loop, a main coil 203, and a main capacitor 204. A tuning coil arrangement 205 and 206 is provided, so that the resonant frequency of the induction line can be tuned by varying the mutual inductance of coils 205 and 206. This can be achieved in a number of ways; using either electrical or mechanical adjustments. The simplest solution is to provide one coil within the other, each wound on a cylindrical (preferably plastics) former, with the inner coil capable of being moved relative to the outer coil. This can be achieved in a number of different ways. For example, the inner coil could be telescoped in or out with respect to the outer coil, so that there is a different degree of overlap, and hence a different resulting frequency of the induction line as the inductance of the coils is varied. Alternatively, the resonant frequency can be tuned, by rotating the inner coil with respect to the outer coil. This is the preferred arrangement, in which the length of the inner coil is shorter than the internal diameter of the outer coil, so that the inner coil can be rotated about its midpoint relative to the position of the outer coil. Thus maximum inductance can be achieved when the inner coil has its longitudinal axis aligned with the longitudinal axis of the outer coil, and minimum inductance can be achieved when the inner coil has its longitudinal axis at right angles to the longitudinal axis of the outer coil.

By this means, the resonant frequency of the induction line 201–202 can be varied, to take account of an increase or decrease in the number of vehicles on the induction line, and the amount of power that the or each vehicle draws from the induction line.

Embodiment 3

Figure 3:
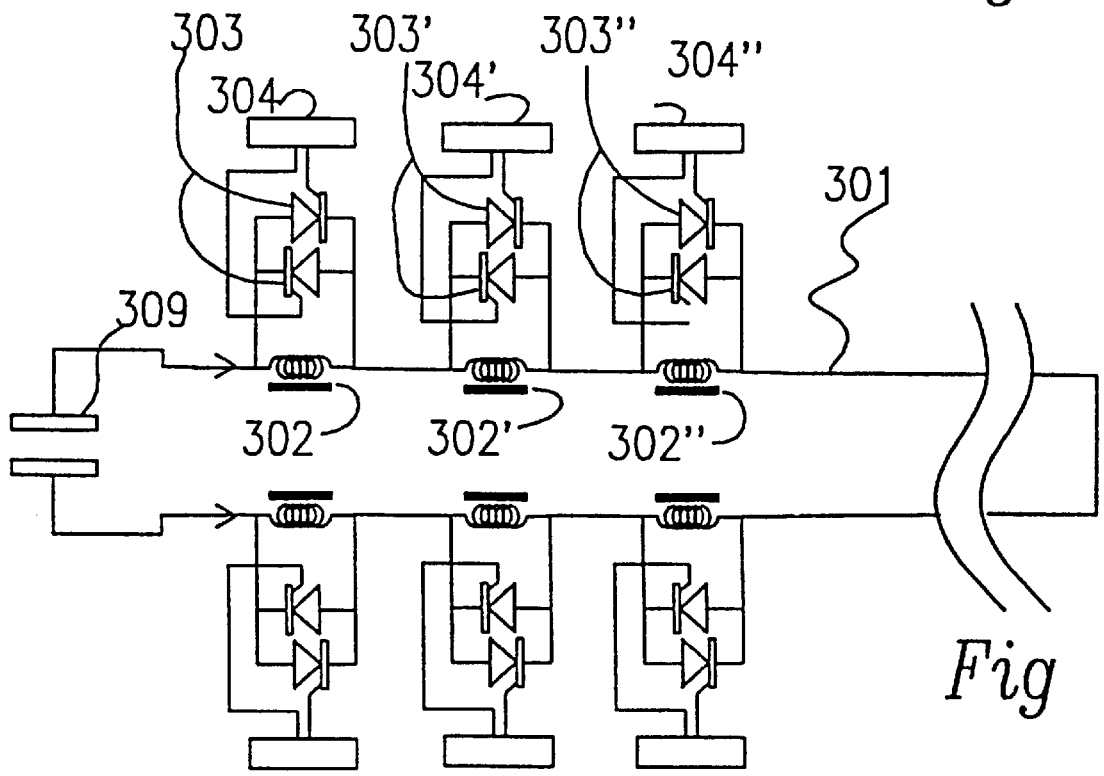
FIG. 3: is an illustration of a solution using switched inductors to vary the resonant inductance by small increments.

FIG. 3 illustrates the principles of this modification, in which part of the main resonant conductor is illustrated as 301, having a group of discrete inductances (302, 302', 302" etc) placed in series with it. Each inductance has a shorting switch, such as a solid-state switch 303, 303', 303" etc) in series with it. Here we show the use of back-to-back SCR devices as the solid-state switches, although other devices are usable, such as TRIACs, or MOSFET devices (preferable on the grounds of a low ON resistance and therefore a low $I^2R$ heat loss). A gate power supply (304, 304', 304" etc) is provided for each SCR device and an isolated drive input is used to connect a control signal. Preferably the values of the inductances are graded in an increasing series, so that a wider range of compensating inductance is available yet with fine increments.

Preferably, track symmetry is maintained by making equal changes to the inductance of both legs of the track. In use, a steady gate current is caused to flow through a particular SCR 303x whenever a particular incremental inductance 302x is not required, as determined by a frequency monitoring device.

Embodiment 4

The prior-art method of allowing the resonant power supply to detect zero-crossing points of the resonant current in the primary circuit, and switch over at that moment, resulting in a resonant power supply whose actual operating frequency is set by instantaneous values of L and C and therefore can drift may be replaced by a method in which the switch-over points are determined by an external, independent, and stable clock. Although the resonant circuit may no longer emulate a pure resistance whenever the operating frequency is not the same as its resonant frequency, and therefore a power factor component will arise, this is minimal when measured at the switching devices on a single-cycle basis. In order to compensate for possibly troublesome power factor effects, switched inductances or capacitances may also be introduced into the circuit as per embodiments in FIGS. 3 or 7 above. This method does not require any re-tuning on the part of individual trolleys, and it is insensitive to the effects of over-critical damping on the power factor around resonance (See FIG. 8). It has the further advantage for airports and the like that any radiated electromagnetic interference is of a constant frequency, which may be placed where it does not interfere with identified devices.

Figure 4:
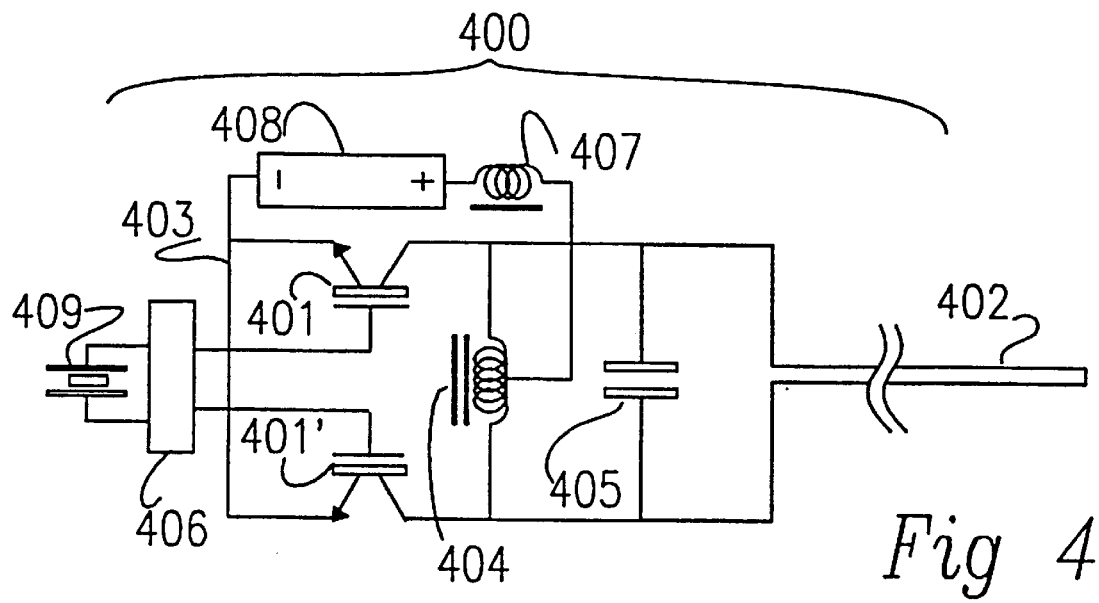
FIG. 4: is an illustration of a system to provide a frequency-stable source for the primary power supply rather than allowing it to drift in frequency.

In more detail, FIG. 4 shows a simplified diagram 400 of a constant-frequency resonant power supply, with two solid-state switches 401, 401' alternately connecting each side of the resonant line 402 to one power rail 403; meanwhile a DC return is provided through the centre-tapped choke 404. A capacitor 405 is the resonating capacitor. A crystal-controlled oscillator with an optional divider chain 406 (crystal: 409) generates complementary 10 KHz drive pulses to the solid-state switches. (10 KHz is a preferred frequency; some other frequency may be used.) Optionally, to take account of thermal effects on resonant components for example, a frequency may be generated which is stable in the short term but is varied in accordance with (for example) ambient or local temperatures.

Embodiment 5

In this embodiment the primary circuit resonant frequency is allowed to find its own stable level, while the onus is put on each of the consumer devices to individually track that frequency by causing their own secondary resonant circuit parameters to change in order to match it.

Advantages of this approach include (a) smaller currents are involved, (b) the system is more robust in that it has inherent redundancy, (c) the sensing process is located within the devices responsible for variations in load and (d) possible voltage limits are less likely to be exceeded—especially by transients—as the secondary resonant circuit will tend to minimise the peak amplitude of any transients generated by switching capacitors.

Figure 5:
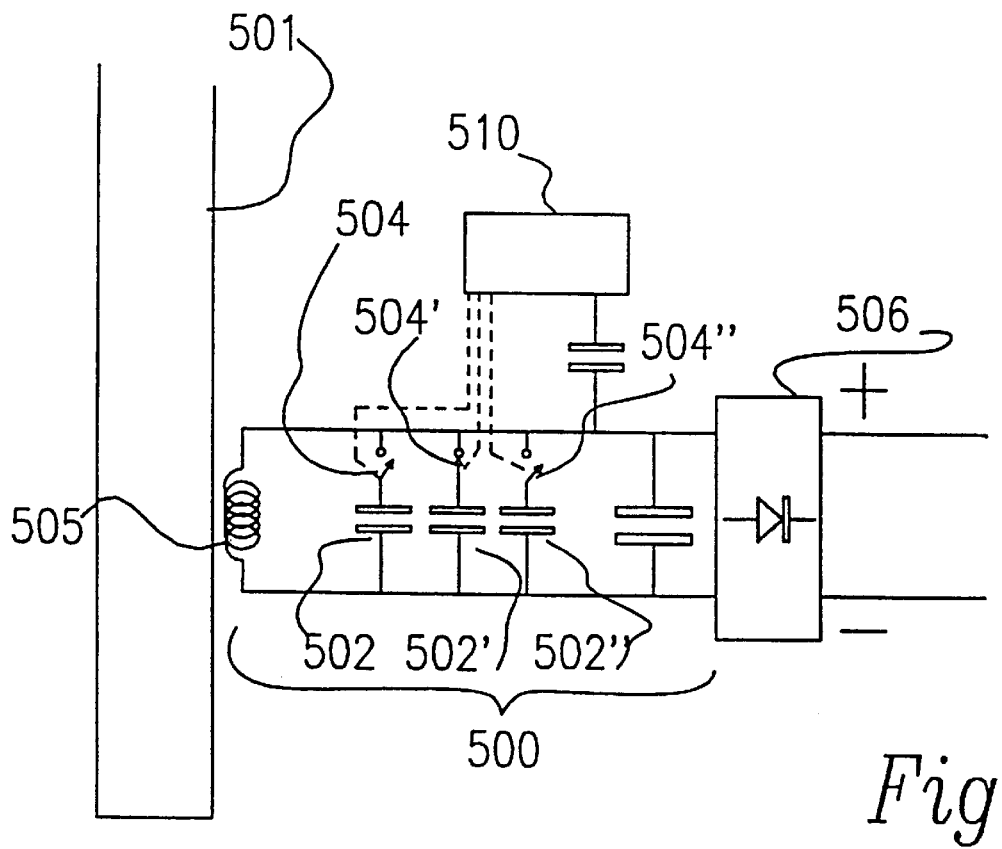
FIG. 5: is an illustration of one means for tuning (or frequency-tracking) within the secondary circuits—such as the trolleys themselves.
Figure 7:
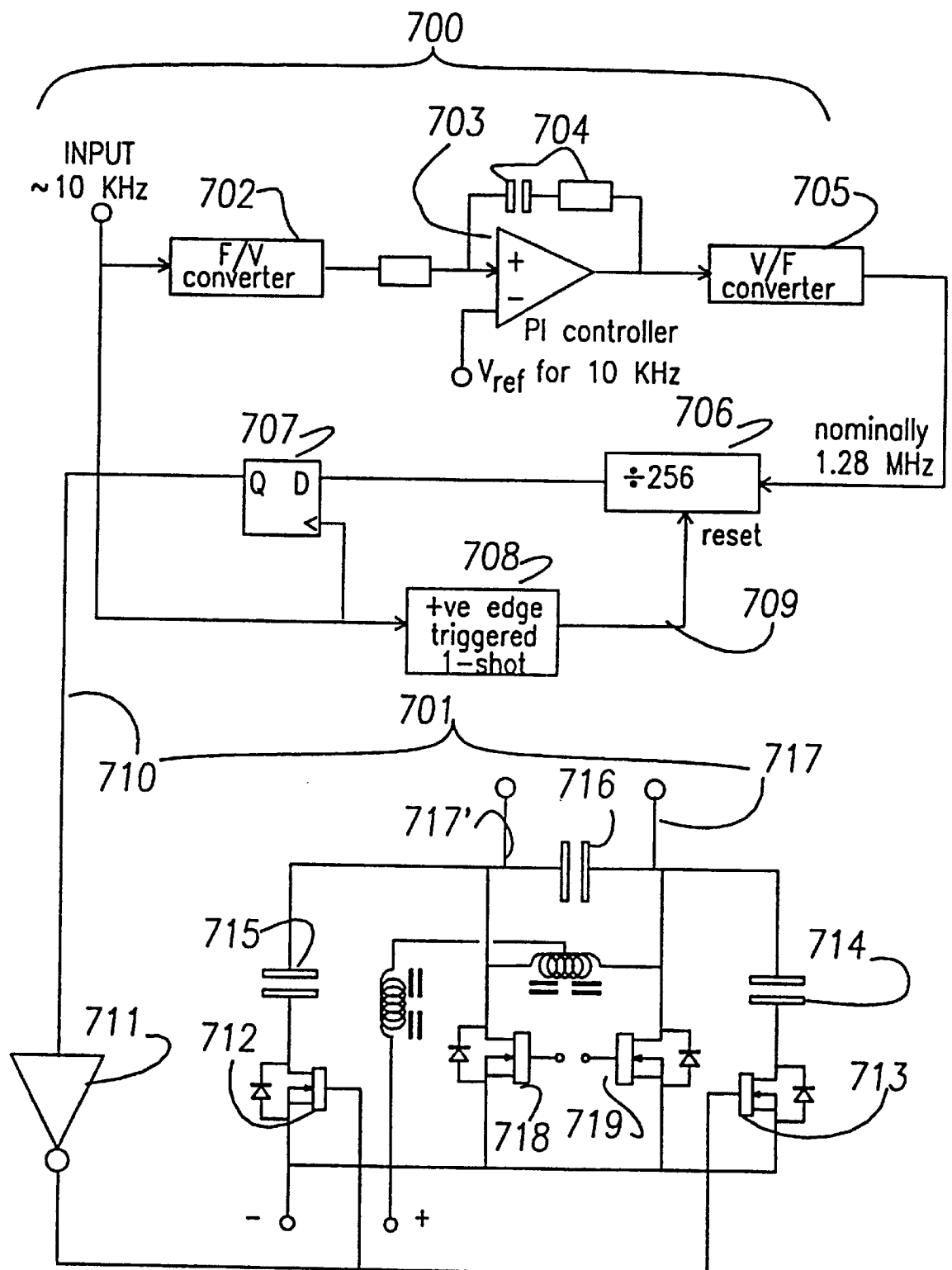
FIG. 7: is a circuit that tests the present operating frequency and continually adjusts tuning of the power supply. It is based on a proportional-integral controller and uses capacitors and switches in parallel with the main resonant capacitor.

FIG. 5 shows a secondary resonant circuit 500, together with a frequency monitor 510 (which may comprise a phase-locked loop, a circuit like that shown in FIG. 7, or a pre-programmed set of cause/effect combinations—a lookup table), a series of incremental capacitors 502, 502', 502" etc, and series switches 504, 504', 504" etc, which in use are switched by the controller so that the resonant frequency of the entire circuit 500 is caused to closely track the operating frequency of the primary circuit 501.

Embodiment 6

Figure 6:
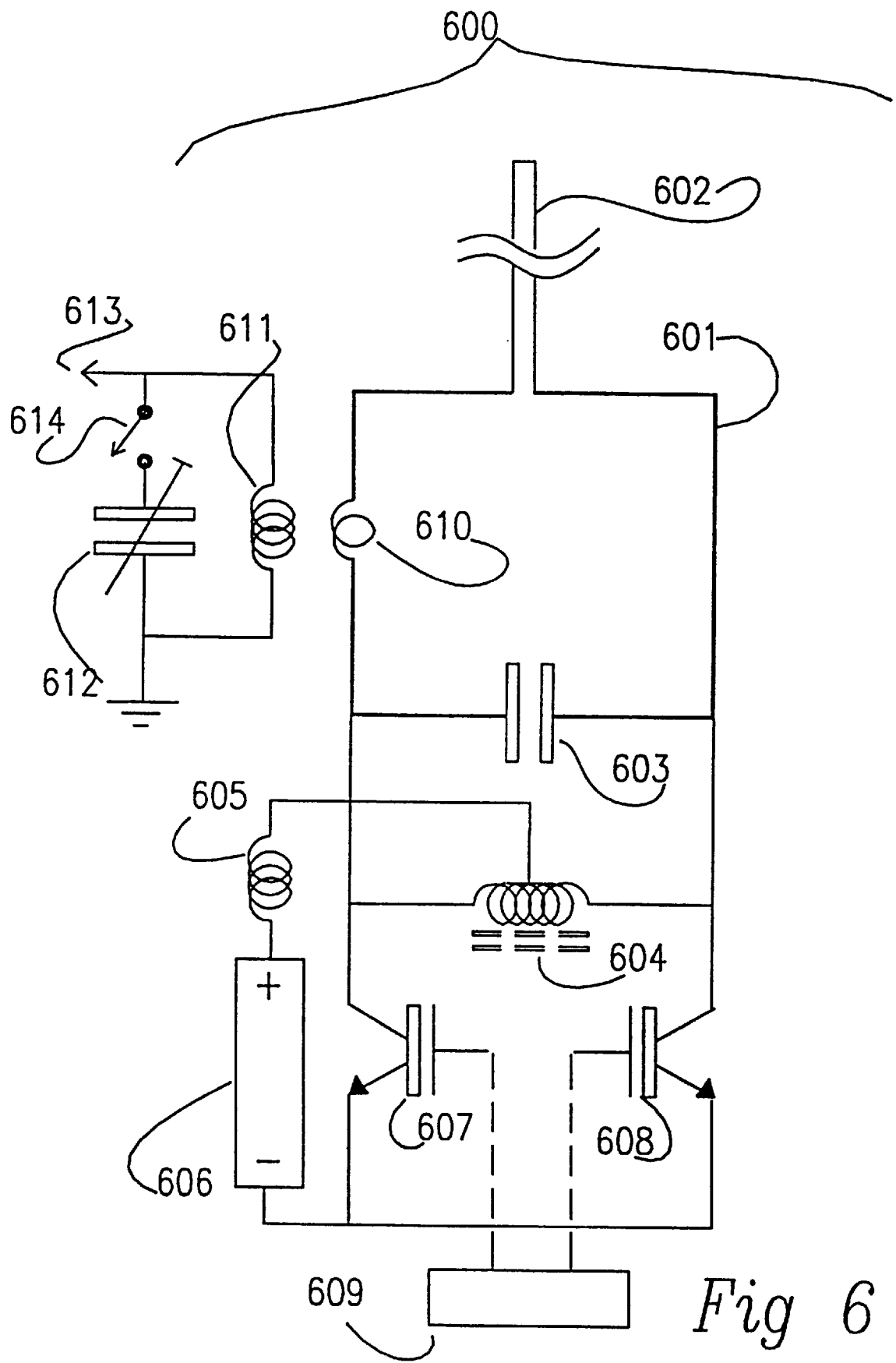
FIG. 6: is an illustration of a "dummy trolley" or artificial secondary resonant circuit within or near the power supply, used to effect control and optionally act as a sensor of induction line parameters.

The specialised secondary circuit or "dummy trolley" embodiment shown in FIG. 6 is a hybrid in that it is like an on-trolley frequency shifter as in the previous embodiment, but, being located adjacent to the switching power supply it may be under the control of a master controller and furthermore can be used as a line monitoring device.

While secondary circuits are normally provided about a resonant inductive power transfer system as mobile consumers, a dedicated and fixed secondary circuit, preferably located at or within the main switching power supply and inductively coupled to the power supply output can be used to (a) monitor system performance and (b) modify the characteristics of the primary loop with relatively little cost.

FIG. 6 shows a typical specialised secondary resonant circuit or "dummy trolley" ( 611–613), coupled to an inductively powered track system 600. (603 is the main resonant capacitor, 604 is the centre-tapped powering inductor, while the inductor 605 provides a constant current supply from the DC source 606. 607 and 608, the switching devices, are controlled by a controller 609). Secondary inductor 611 is coupled at primary inductor 610 to the primary resonant circuit 601, and the tuning capacitor 612 completes the resonant circuit in this secondary resonant circuit. Capacitor 612 is shown as a variable device; a master controller may vary this capacitor as for embodiments 1, 5 and 7, in order to tune the "dummy trolley" and thereby affect resonance in the primary circuit. As this circuit is electrically isolated from the primary, one side of it may be connected or referenced to system ground, and a test point 613 can be used to provide signals proportional to the resonant circuit current. Means may be provided to cause the input power to the switching or resonant power supply to be cut if the circulating resonant current becomes too high. The preferred turns ratio of inductance 611 compared to inductance 600 is preferably greater than 1, to provide for relatively low-current switching in the dummy trolley, to effect a varying capacitance 612 by, for example, switching in or out increments of capacitance.

This mode of coupling can give a relatively high-voltage induced resonating current which is rather more amenable to control in a low-loss manner with solid-state switches such as MOSFET devices or high-voltage bipolar transistors. The I of $I^2R$ losses is made smaller for a given power. As these active devices are incorporated within a secondary resonant circuit they are relatively speaking better protected from transients in the primary resonant circuit. This method is generally preferable over methods that modify frequency by action directly within the primary circuit.

This method, involving a resonant circuit adjacent to and under direct control of the master frequency controller, also has the advantage that changes can be caused to happen rapidly, thus immediately compensating for shifts in primary frequency because the slave resonant circuit is within or close to the resonant power supply and its controller.

Calculations on the "effective capacitance" that can be provided by a dummy trolley.

For a realistic example (see FIG. 5) in which, the secondary inductance 611 of the dummy trolley is 300 $\mu$H, tuned to resonance by a capacitor 612 of 0.9$\mu$F, the mutual inductance M is 10 $\mu$H, w (frequency) is $2* pi * 10^4$, and in which a switch 614 can render the resonant circuit open-circuit . . .

The impedance reflected into the track is $$Z2'=(w^2m^2)/Z2$$

where $$Z2=j(wL2-1/wC2)$$

In the case where C2 (612) is switched out of circuit (open circuit). . .

$$Z2'=-j.\ 20.9\times10^{-3}$$

$$=>C2'=759\ \mu F$$

In comparison to the case where C2 is switched into circuit . . .

$Z2'=-j.\ 1.165$ $=>C2'=46.9\ \mu F$

Thus a 0.9 microfarad capacitor can simulate a very much greater capacitor to the primary track.

Embodiment 7

One embodiment of frequency control includes a plurality of capacitor pairs placed across the solid-state switches of the switching power supply. These capacitors are provided with values in an arithmetic series, so that a digital approximation to a given value could be created and held.

Surprisingly it has been found that, as the frequency of the resonating system takes some time to adjust to a new frequency, it is possible to use just one additional capacitor pair across the solid-state switches and vary the duty cycle over which the pair is connected into the circuit in order to achieve a fine control over frequency. The time course of frequency change, as a result of an imposed step alteration in L or C in this type of resonant inductive power distribution system, is relatively long—at least several to ten milliseconds—especially where one or more secondary resonant circuits are carrying resonant current at a first frequency and will tend to continue to resonate at that first frequency.

In order to gain a finer and more continuous control of frequency than might be provided by long-term introduction of relatively large increments of inductance or capacitance, these increments may be repetitively switched in and out of the system for even single-cycle durations whereupon the mean frequency will assume an intermediate value.

FIG. 7 illustrates at 701 a resonant power supply similar to that of FIG. 6 in which one additional pair of semiconductor switches 712, 713 are switched ON or OFF by gate control buffer 711 (e.g. integrated circuit type ICL 7667) in order to insert capacitors 714 and 715 into the resonant circuit.

The control section is illustrated at 700. A square-wave version of the resonant voltage picked off from across the capacitor 716 (typically converted by limiting and a Schmitt trigger, as is well known in the art) is applied to the input. This will be approximately 10 KHz for preferred systems. The signal is fed to a frequency-to-voltage converter 702, preferably having a time constant of about 10 mS. The frequency-dependent output of this stage is taken to a proportional-integral controller section 703 for which feedback components 704 determine its response characteristics. A steady voltage is fed in at Vref to provide a reference for the circuit. The output is fed to a voltage-to-frequency converter 705; the output of which is at nominally 1.28 MHz and which is fed to an 8-bit binary divider 706 for a division of 256. A reset input to this divider is created from the positive-going edges of the input square-wave signal, as a brief pulse (preferably less than 0.5 $\mu S$) within a one-shot device 708.

Thus the divider 706 creates a square-wave signal of nominally 5 KHz frequency. This is fed to the D input of a flip flop 707, while the original signal is fed to the clock input. Thus the Q output of the flipflop is either high (when the track frequency is too low and capacitance is to be removed) or low (when the track frequency is too high and extra capacitance is required). This signal is fed to the buffer 711 and on to both MOSFET or IGBT transistors 712 and 713 and hence causes the capacitors 714 and 715 to be brought into or out of circuit.

There are, of course, many other ways in which frequency control might be implemented.

Figure 8A:
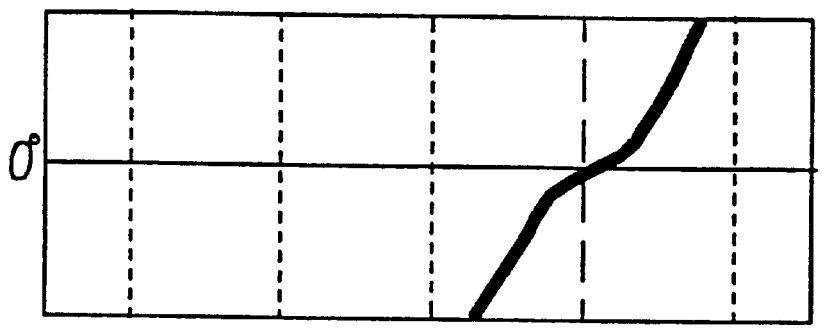
FIG. 8a–c: shows diagrammatic graphs of phase angle (Y axis) against frequency (X axis) in circuits that are (8a) under-coupled, (8b) critically coupled, and (8c) over-coupled.
Figure 8B:
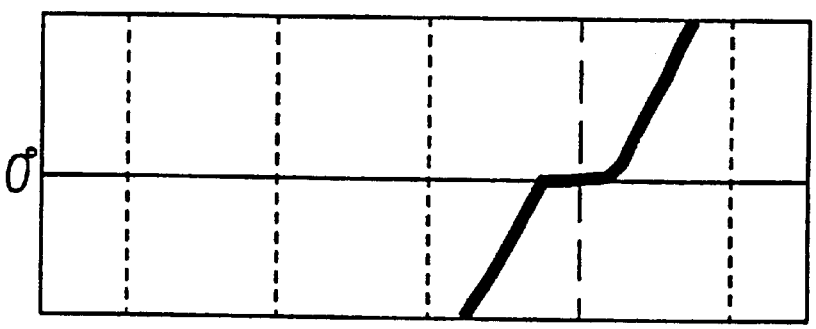
Figure 8C:
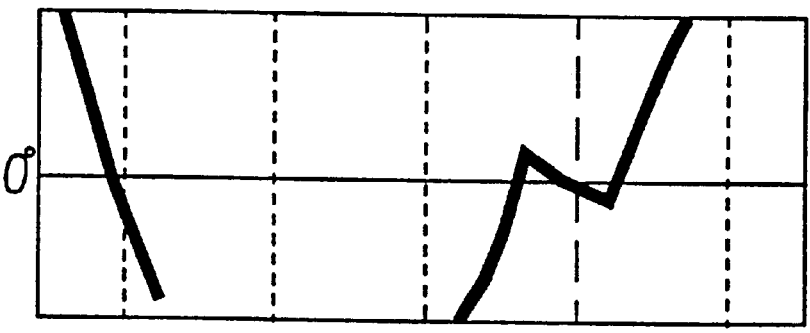

FIG. 8a, b, and c illustrate measurements of the relationship of phase angle (Y axis) against frequency (X axis) for a resonant power distribution system having both resonant primary and resonant secondary circuits. The nominal resonant frequency is 10 KHz. Points where the zero phase angle line is crossed represent true or false resonant modes.

Measurements and computer modelling of an inductive power transfer system show that as the coupling between primary and secondary circuits rises (e.g. from that shown in FIG. 8a towards FIG. 8b) towards a critical value (FIG. 8b), the phase angle against frequency graph develops a kink, tending to the horizontal. With over-critical coupling, a graph of phase (Y) against frequency (X) will show a brief reversal of direction about the zero point (FIG. 8c) if the circuit under test is swept through resonance. Critical coupling is defined as the condition wherein the plot runs horizontally about the resonance point, while in undercritical coupling the plot crosses the zero phase line once. The switching resonant power supply may, with critical coupling conditions, show an instability in operating frequency since the "pure resistance" or zero power-factor conditions are satisfied at more than one frequency.)

Embodiment 8

In this embodiment a primary circuit having more than one resonating capacitor spaced apart from one another (a practice used to extend track length among other reasons) has been constrained to minimise a possible variety of oscillation frequencies. Any L and C pair may form a resonant circuit, and if typical manufacturing tolerances or track inductance variations are considered, it will be apparent that a number of possible resonant frequencies may be adopted, by various combinations of adjacent inductance and capacitance. If the capacitors were to be tied together, more particularly at points where the amplitude and phase are similar, the possible modes of oscillation would be restricted. Zero-inductance cables may be used to link spaced-apart nodes of the power supply and thereby restrict possible modes of oscillation.

A zero-inductance cable (e.g. 910 or 924) is typically one having a pair of physically symmetrical conductors, electrically insulated from one another yet closely coupled magnetically. A close approach to the ideal is a length of litz wire with conductors randomly allocated to one group or the other, hence interspersed. Multiple-conductor telephone cable, for which colour-coding facilitates grouping, is a more realistic type of cable. In use, a current in one conductor flows against a current of opposite sense in the other conductor so that the magnetic fields are substantially cancelled out by each other and the conductor appears to have substantially no intrinsic inductance.

FIG. 9 shows three examples of the use of zero-inductance cables to link spaced-apart nodes of a circuit and thereby restrict oscillation modes. FIG. 9a illustrates a single primary conductor module having two capacitors 906 and 907 separated by intrinsic inductance 905 and 909 within primary conductors. The zero-inductance cable 910 joins the capacitors, and a crossover at 911 is provided because the phase of the current at top left (see the vectors labelled V) will be opposite to the phase of the current at top right, in resonance, but the same as the phase of the current at bottom right. Preferably capacitors are matched reasonably well at the time of assembly, so that difference currents flowing through the zero-inductance cable are minimised, and so that remaining currents in the zero-inductance cable comprise dynamic corrections to cancel out imbalances.

FIG. 9b illustrates an extended zero-inductance cable joining the ends of a modular primary track so that the capacitor/generator pair 922 is effectively locked to the voltage across the far capacitor 923. Intermediate modules (like 921) are shown with connectors to adjacent modules.

FIG. 9c illustrates a special case of 9b, in which an almost continuous loop track 940 forms a ring and is energised by a power supply 949. (Typical manufacturing processes commonly have conveyer devices travelling in a closed circuit of this style). In order to match the nodes at the capacitors at the beginning (943) and the end (947), a simple connection or cable including a cross-over 950, completes the circuit of the entire track conductors 941 and 942. Intermediate primary conductor modules are not shown here.

Finally, it will be appreciated that various alterations and modifications may be made to the foregoing without departing from the scope of this invention as set forth in the following claims.

We claim:

1. In a non-contact power distribution system for causing electric power to be transferred from a primary pathway to a vehicle on the primary pathway, wherein the primary pathway has elongated primary conductors that are part of a primary resonance circuit having an inductance and a capacitance for resonating at a primary resonant frequency, the elongated primary conductors having an inherent inductance that is a part of the inductance of the primary resonance circuit, wherein the primary resonance circuit is for generating an alternating magnetic field for being intercepted by the vehicle, wherein the vehicle is provided with at least one secondary resonant circuit for resonating at a secondary resonant frequency and an inductive coil for intercepting the magnetic field to generate an electromotive force, the improvement comprising:

a switching power supply for generating a high frequency primary resonant current at the primary resonant frequency; and means for maintaining the primary resonant frequency and the secondary resonant frequency at the same frequency when the vehicle is moving on the primary pathway.

2. The system of claim 1, wherein the elongated primary conductors each have plural resonating capacitors at spaced-apart nodes, the improvement further comprising a zero inductance cable for connecting the resonating capacitors at nodes of like phase.

3. The system of claim 1, wherein the improvement further comprises a further resonant circuit having a selectable inductance and a selectable capacitance for changing a resonant frequency of the further resonant circuit, said further resonant circuit being coupled to the primary resonant circuit so as to stabilize the resonant frequency of the primary resonant circuit.

4. The system of claim 1, wherein said switching power supply comprises a symmetrical pair of identical switches for switching at zero crossing intervals of the high frequency resonant current.

5. The system of claim 4, further comprising a stable oscillator for driving said switching power supply.

6. The system of claim 1, wherein the improvement further comprises means for varying the resonating capacitance of the primary resonant circuit so that the frequency of the primary resonant circuit is stable.

7. The system of claim 6, wherein said means for varying comprises one or more capacitors that are switchably connected to the primary resonant circuit.

8. The system of claim 1, wherein the improvement further comprises means for varying the resonating inductance of the primary resonant circuit so that the frequency of the primary resonant circuit is stable.

9. The system of claim 8, wherein said means for varying comprises a first inductor in series with a first one of elongated primary conductors and a second inductor in series with a second one of the elongated primary conductors, said first inductor being coupled by a variable amount to said second inductor.

10. The system of claim 8, wherein said means for varying comprises at least one discrete inductor in series with each of the elongated primary conductors, each of said discrete inductors being switchably connected to the primary resonant circuit.

11. The system of claim 1, wherein the improvement further comprises means for detecting the frequency of the primary resonant circuit and means for changing the resonant frequency of the secondary resonant circuit to match the detected frequency.

12. The system of claim 11, wherein said means for changing comprises means for changing a resonating capacitance of the secondary resonant circuit.

13. The system of claim 11, wherein said means for changing comprises means for changing a resonating inductance of the secondary resonant circuit.

14. The system of claim 11, wherein said improvement further comprises means for determining a power factor of the secondary resonant circuit, and wherein said means for changing comprises means for changing one of a resonating inductance and a resonating capacitance of the secondary resonant circuit.

15. The system of claim 11, wherein said improvement further comprises means for determining a power factor of the secondary resonant circuit, and wherein said means for changing comprises means for changing a resonating inductance of the secondary resonant circuit.

* * * * *